United States Patent [19]

Leonardo

[11] Patent Number: 4,607,577
[45] Date of Patent: Aug. 26, 1986

[54] OVERBED TABLE

[76] Inventor: Stephen V. Leonardo, 1128 Blanchard St., Downers Grove, Ill. 60515

[21] Appl. No.: 761,775

[22] Filed: Aug. 2, 1985

[51] Int. Cl.⁴ .............................................. A47B 9/00
[52] U.S. Cl. .................................... 108/144; 108/148; 248/410
[58] Field of Search ........................ 108/144, 146, 148; 248/408, 162.1, 412, 423, 410, 123.1

[56] References Cited

U.S. PATENT DOCUMENTS

| | | | |
|---|---|---|---|
| 1,687,128 | 10/1928 | Hall ................................. | 108/144 X |
| 3,117,392 | 1/1964 | Junkunc .......................... | 108/144 X |
| 3,188,986 | 6/1965 | La Vigne ......................... | 108/144 X |
| 3,310,008 | 3/1967 | Aleksa et al. ....................... | 108/146 |
| 3,314,384 | 4/1967 | Mann et al. ........................ | 108/146 |
| 3,380,405 | 4/1968 | Barecki et al. ................... | 108/146 X |
| 3,715,997 | 2/1973 | Barth ................................. | 108/146 |
| 3,976,016 | 8/1976 | Longbottom ...................... | 108/144 |
| 3,999,492 | 12/1976 | Emrick ................................ | 108/144 |
| 4,195,578 | 4/1980 | Benoit et al. ........................ | 108/144 |
| 4,401,036 | 8/1983 | Russo et al. ..................... | 108/144 X |

Primary Examiner—William E. Lyddane
Assistant Examiner—José V. Chen
Attorney, Agent, or Firm—John C. Shepard

[57] ABSTRACT

An overbed table has a base, an adjustable support leg assembly and a table top carried at the upper end of the support assembly. The support assembly includes a vertical housing fixed to the base, support rods slidably mounted within the housing by bearing blocks, and a latch mechanism for locking the housing and rods against relative motion. A latch pivotally mounted to the support rods is spring biased towards a locked position and is rotatable to an unlocked position by a cable extending upwardly to a remote handle.

11 Claims, 7 Drawing Figures

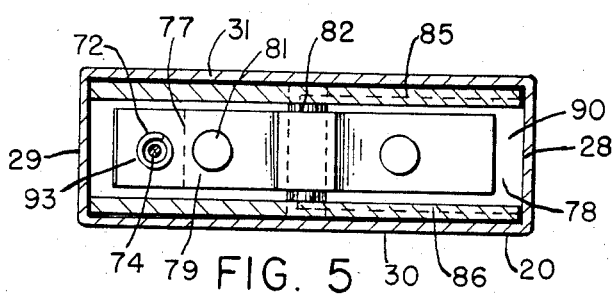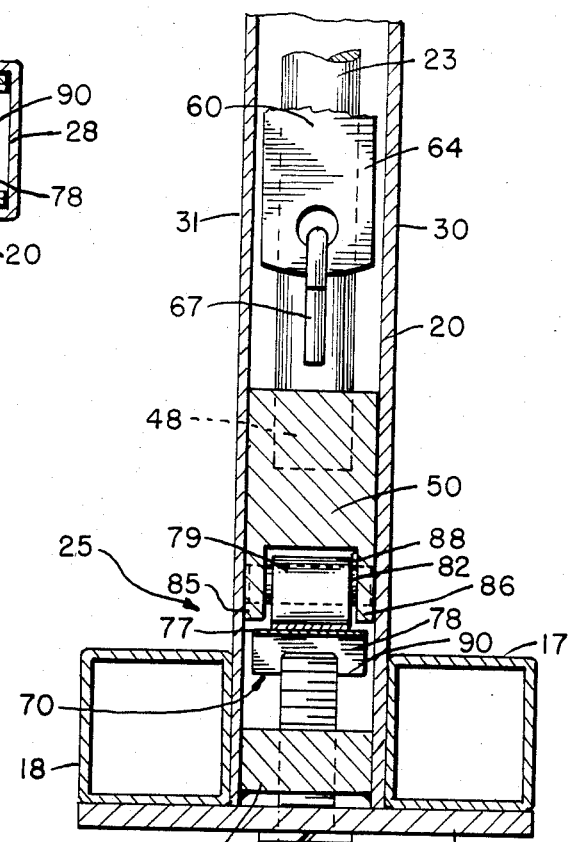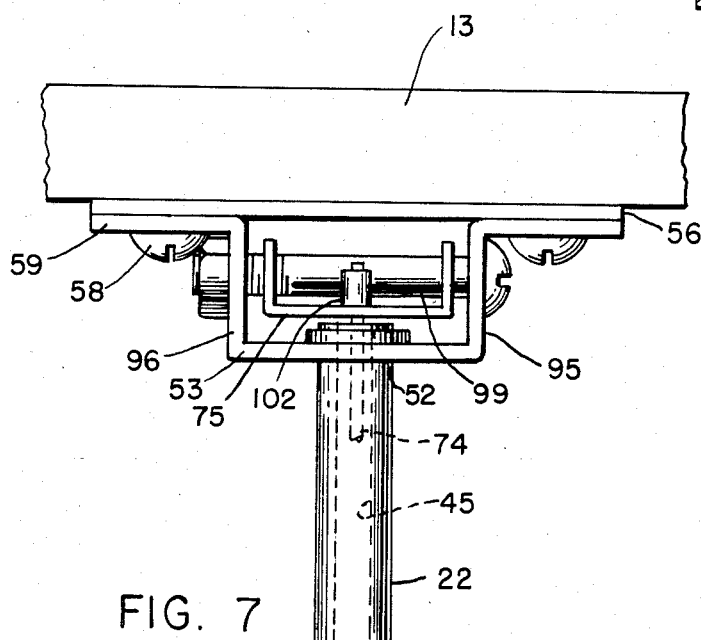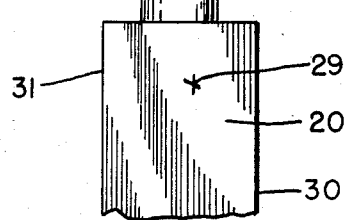

OVERBED TABLE

BACKGROUND OF THE INVENTION

1. Technical Field

This invention relates generally to overbed tables and, more particularly, to a mechanism for moving and locking a table top between raised and lowered vertical positions.

2. Background Art

Overbed tables are often employed in hospitals and the like to provide a table which has a vertically movable top that may be conveniently adjusted and used by a person lying in bed. These tables generally have a base, an adjustable support column, and an table top overlying the base. The supporting structure is typically located at one side of the base and table top so that the base can be moved under the bed with the table top extending over the bed above the user. Such an overbed table usually has a spring to assist in raising the table and means for locking the table at a selected height over an infinite range of vertical positions.

Typically, these tables are relatively complex and costly structures with telescoping supporting members and complicated locking mechanisms. Many bedside tables use a pair of rectangular metal tubes as support members with rollers acting as guides between the tubes as they are moved relative to one another. A variety of locking mechanisms have been employed. Examples of such mechanisms for locking telescoped tubes together in selected position include a spring biased detent with pawl and rack, a rocking brake plate, and a pivoting cam. All of these prior art designs have been found to be overly intricate and expensive to manufacture.

SUMMARY OF THE INVENTION

The present invention is directed to overcoming one or more of the problems as set forth above.

According to the present invention, an overbed table having a base, an adjustable support leg assembly, and a table top, includes a vertical housing fixed to the base, support rods secured to the top and slidably mounted within the housing by bearing blocks, spring means connected between the housing and the support rods to urge the rods upwardly, a latch pivotally carried by the support rods and spring biased towards a locking position with the housing, and a cable extending between the latch and a handle, whereby remote actuation of the handle pulls the latch from a locked position to permit vertical movement of the support rods within the housing.

In one exemplary embodiment of the invention, a bearing block is mounted on the upper portion of the housing and has guide apertures through which the support rods slide. A second bearing block is carried at the lower end of the support rods and is vertically slidable within the interior of the housing. The cable extends from the underside of the latch to the topside of the handle and has enlarged ends so that the handle can pull the cable upwardly to operate the latch.

In another exemplary embodiment of the invention, one of the support rods is tubular having an axial bore through which the cable extends.

In a preferred embodiment of the invention, the second bearing block has spaced flanges for pivotally mounting the latch under the block and a bore axially aligned with the rod bore, the latch spring being a coiled compression spring partially disposed within the bearing block bore and surrounding the cable which extends therethrough.

A feature of the invention is that the table has a minimum of parts, yet can effectively be locked in any vertical position and released with minimum effort.

BRIEF DESCRIPTION OF THE DRAWINGS

The details of construction and operation of the invention are more fully described with reference to the accompanying drawings which form a part hereof and in which like reference numerals refer to like numerals throughout.

In the drawings:

FIG. 5 is a horzontal cross-sectional view of the overbed table taken along line 5—5 of FIG. 2;

FIG. 6 is a partial, vertical cross-sectional view of the overbed table taken along line 6—6 of FIG. 2; and, FIG. 7 is a partial, side elevational view of the overbed table taken along line 7—7 of FIG. 2.

DESCRIPTION OF THE PREFERRED EMBODIMENTS

Best Modes for Carrying Out the Invention

Figure 1:
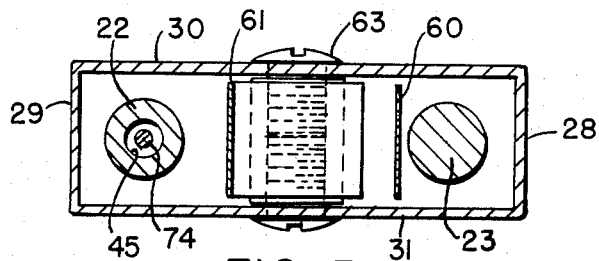
FIG. 1 is a side elevational view of an overbed table constructed in accordance with the present invention.

Referring to FIG. 1 of the drawings, an overbed table, generally designated 10, includes a base 12, a table top 13 with a horizontal surface overlying the base 12, and an adjustable support leg assembly, generally designated 15, which supports the table top 13 at varying heights above the base 12. The base 12 includes horizontal members 17 and 18 provided with casters 19 so that the table 10 is easily movable across a floor (not shown).

Referring to FIGS. 2 through 7, the adjustable support leg assembly 15 is seen to comprise a tubular leg housing 20 extending vertically upward from the base 12, a pair of vertical support rods 22 and 23 axially movable within the leg housing 20, and a locking mechanism, generally designated 25.

Figure 2:
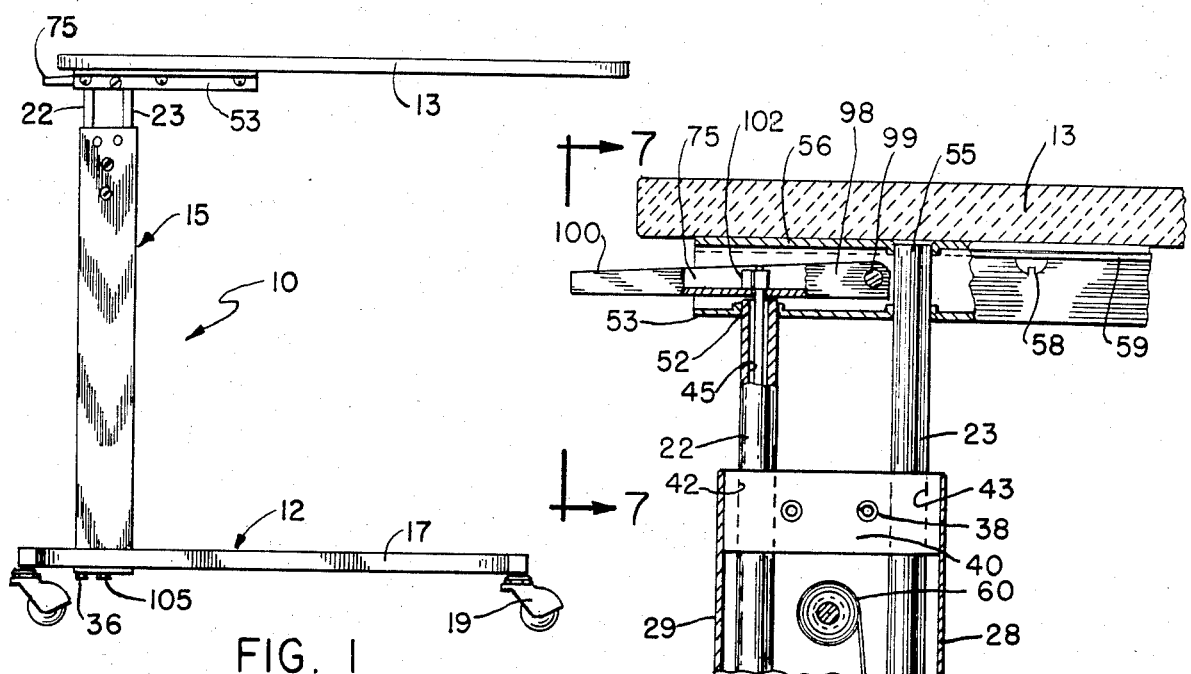
FIG. 2 is an enlarged, side elevational view, partially in section, of the overbed table shown in FIG. 1.

The leg housing 20 is defined by a front wall 28, a back wall 29, and side walls 30 and 31. To mount the leg housing 20 to the base 12 as seen in FIGS. 2 and 6, a leg anchor plate 33 at the lower end of the leg housing 20 is fixedly secured to a base anchor plate 34 by support screws 36. The base anchor plate 34 is welded to the base members 17 and 18 and the leg anchor plate 33 is welded within the lower end of the leg housing 20. Secured within the upper end portion of the leg housing 20 by spring pins 38 is a stationary upper bearing block 40 having spaced apertures 42 and 43 through which the support rods 22 and 23, respectively, are slidable.

One of the support rods 22 is tubular having a bore 45 extending axially therethrough. The other support rod 23 may be solid as shown herein. The lower ends 47 and 48 of the support rods 22 and 23, respectively, are anchored within a movable lower bearing block 50 which is vertically slidable within the interior of the hollow leg housing 20. When the table support rods 22 and 23 are moved axially, the horizontal relationship between the leg housing 20 and the support rods 22 and 23 is maintained by the guide apertures 42 and 43 of the bearing block 45 through which the respective support rods 22 and 23 slide and by the lower bearing block 50 sliding within the leg housing 20 against the inner surfaces of the housing walls 28-31.

The upper end 52 of the tubular support rod 22 is fixed to a U-shaped mounting bracket 53, while the upper end 55 of the solid support rod 23 is fixed to a flat mounting bracket 56 on the underside of the table top 13. Both brackets 53 and 56, in turn, are secured to the underside of the table top 13 at one edge by a plurality of screws 58 tightened against the outwardly extending flanges 59 of the U-shaped bracket 53. The support rod bore 45 opens into the space defined by the bottom of the U-shaped bracket 53 and the bottom of the flat bracket 56.

Figure 3:
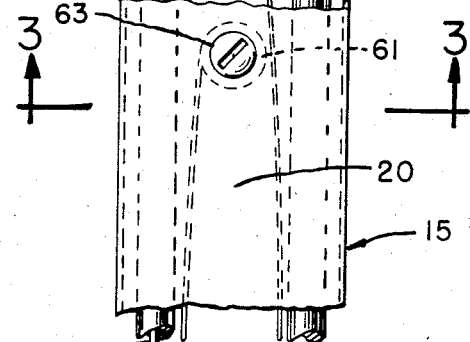
FIG. 3 is a horizontal cross-sectional view of the overbed table taken along line 3—3 of FIG. 2.
Figure 3:
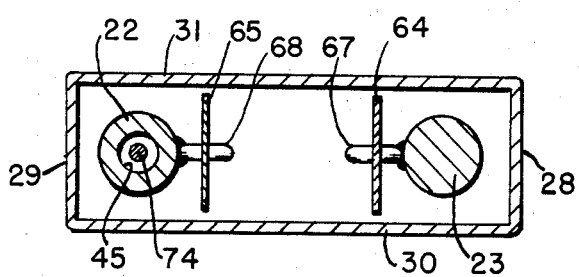
Figure 4:
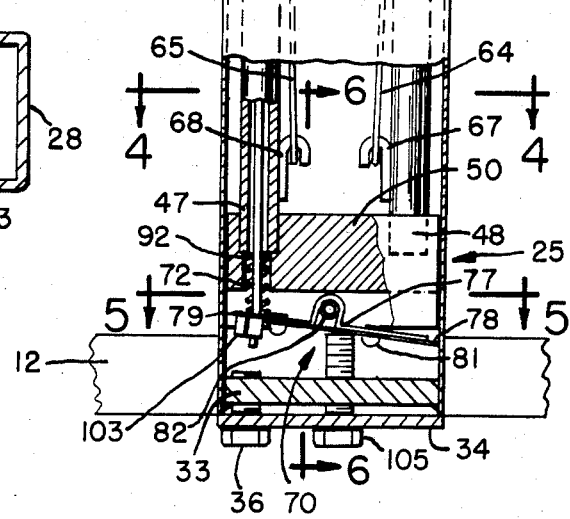
FIG. 4 is a horizontal cross-sectional view of the overbed table taken along line 4—4 of FIG. 2.

As seen in FIGS. 2 and 3, a pair of constant tension lift springs 60 and 61 are rotatably mounted within the leg housing 20 by screws 63 threaded through the housing walls and extending into the interior of the leg housing 20. As seen if FIGS. 2 and 4, the coiled leaf springs 60 and 61 have their respective free ends 64 and 65 attached to lift hooks 67 and 68 fixed to the lower portions of the support rods 22 and 23. The lift springs 60 and 61 urge the support rods 22 and 23 and, therefore, the table top 13 upwardly against the force of gravity to counterbalance the weight of the table and assist the user in raising the table.

The locking mechanism 25 broadly includes a latch structure, generally designated 70, pivotally mounted to the lower bearing block 50, a coiled compression spring 72 urging the latch structure 70 towards a locking position, an actuating cable 74 to move the latch towards an unlocked position, and a trigger handle 75 for lifting the cable 74 to remotely disengage the latch.

The latch structure 70 comprises a latch 77 defined by a flat latch member 78 and a latch backup plate 79, which are fixed together by rivets 81, and a pivot pin 82 for mounting the latch 77 for pivotal movement about a horizontal axis. The lower bearing block 50 includes a pair of spaced downwardly extending flange portions 85 and 86 defining a recess 88 on the underside of the lower bearing block 50. The pivot pin 82 extends between the spaced flange portions 85 and 86 of the U-shaped bearing block 50 and through an opening (not numbered) defined by the latch member 78 and an arcuate portion of the backup plate 79 so that the latch 77 is mounted within the recess 88. The latch 77 has a free end portion 90 on latch member 78 with a length greater than the distance between the pivot pin 82 and the front wall 28 of the leg housing 20, the free end portion 90 thereby being extendible outward beyond the forward edge of the lower bearing block 50.

The lower bearing block 50 is provided with a vertical bore 92 which is axially aligned with the tubular rod bore 45 and acts as an extension thereof. The latch 77 has another end portion 93 on the latch plate 79 opposite its free end 90 which is positioned below the vertical bore 92 of the lower bearing block 50. The compression spring 72 is partially disposed within the block bore 92 between the latch end 93 and the bottom of block bore 92. The compression spring 72 urges the latch end 93 away from the lower bearing block 50 in a counterclockwise direction so that the free end portion 90 of the latch 77 swings into a locking position in contact with the front wall 28 of the leg housing 20.

The release handle 75, which has a U-shaped cross section, is located within the space between the side portions 95 and 96 of the U-shaped mounting bracket 56 and has one end 98 mounted for pivotal movement about a horizontal axis by way of bolt and bolt 99. The free end 100 of the handle 75 extends outward from the table top 13 and is manually accessible.

The flexible cable 74, which is preferably nylon coated steel, extends from the latch plate 79 upwardly through the compression spring 72 within the bearing bore 92 and the tubular rod bore 45 to the release handle 75. The upper end of the cable 74 extends through an aperture (not numbered) in the trigger handle 75 at a location between its pivoted end 98 and its free end 100 and has a cable fastener 102 to prevent its retraction downwardly through the handle 75. Similarly, the lower end of the cable 74 extends through an aperture (not numbered) in the latch plate 79 and has a cable fastener 103 to prevent its retraction upwardly through the latch plate 79. It should be noted that the cable 74 is not firmly attached to the handle 75 or the latch plate 79.

In operation, the compression spring 72 causes the latch 77 to rotate counterclockwise. Since the length of the free end 90 of the latch 77 is greater than the distance between the pivot 82 and the front wall 28, the latch 77 is urged towards a locking position in contact with the inner surface of the front wall 28 of the leg housing 20. The weight of the table will effect downward movement of the support rods 22 and 23 and force the latch 77 to rotate into a more tightly wedged position between the pivot 82 and the front wall 28 to prevent downward movement of the support rods 22 and 23 within the leg housing 20 thereby locking the vertical position of the table top 13. Downward pressure on the table top 13 will effect further wedging of the latch structure 70 to hold the table top 13 in the selected locked position.

To free the table top 13 and raise or lower it to another vertical position, the handle 75 is lifted. Actuation of the handle 75 in this manner pulls the cable 74 upwardly so that the enlarged lower cable end 103 rotates the latch 77 clockwise against the action of the compression spring 72. As a result, the latch is rotated downwardly away from the inner surface of the housing front wall 20 so that the inner bearing block 50 is free from the leg housing 20. Note that upward pressure on the table top 13 will tend to rotate the latch 77 clockwise releasing it from wedged engagement with the front wall 28. The table top 13 can then be manually moved to any desired height between fully lowered and fully raised positions. When the handle 75 is released, the latch 77 will once again frictionally engage the inner surface of the front wall 28 because of the action of the compression spring 72 urging the latch 77 counterclockwise.

The lowest position of the table top 13 can be adjusted by changing the length of the screw 105 which extends upwardly through the leg anchor plate 33 and acts as a stop against the latch 77 on the bottom of the movable support assembly 15.

Industrial Applicability

From the foregoing, it should be apparent that the overbed table described herein is simple and inexpensive, yet provides a convenient and reliable means for vertically adjusting a table top relative to its base by simply raising a release trigger and applying a small upward or downward force to the table top and locking the table in any desired vertical position by releasing the trigger.

Other aspects, objects and advantages of this invention can be obtained from a study of the drawings, the disclosure and the appended claims.

What is claimed is:

1. In an overbed table having a base, a table top generally overlying said base, and an adjustable support assembly having its lower end secured to the base and its upper end to the table top and allowing the table top to be moved to any desired vertical position and locked, said support assembly comprising:

a hollow support housing vertically mounted to said base having a bearing block with guide apertures;

support members axially slidable within said guide apertures and carrying a second bearing block slidable within said housing;

first spring means connected between said housing and said support members for urging said support members and table top upwardly and counterbalancing the weight thereof;

a latch mounted to said second bearing block for pivotal movement about a horizontal axis and having a free end extending outwardly from said second bearing block;

second spring means disposed between said second bearing block and the other end of said latch for urging said other end away from said second bearing block in one angular direction and said free end towards a locking position in wedged engagement with the wall of said housing to lock said support members relative to said housing;

a trigger mounted to said table top; and, a cable extending between said trigger and said other end of said latch, whereby actuation of said trigger pulls said cable upwardly to pivot said latch in an angular direction opposite the action of said second spring means out of engagement with said wall to unlock said support members thereby permitting vertical movement of said support members within said support housing for adjusting the height of the table top relative to the base.

2. The overbed table of claim 1 wherein one of said support members has an axial bore and said cable extends from said trigger to said latch through said bore.

3. The overbed table of claim 1 wherein said second bearing block has spaced flanges defining a recess on the bottom thereof and said latch is pivotally mounted within said recess.

4. The overbed table of claim 3 wherein one of said support members has an axial bore, said second bearing block has a bore axially aligned with said support member bore, and said cable extends from said trigger to said latch through said bores.

5. The overbed table of claim 4 wherein said second spring means is a compression spring and said cable extends through said spring.

6. The overbed table of claim 5 wherein said compression spring is disposed partially within the bore of said second bearing block.

7. The overbed table of claim 3 wherein a pivot pin mounts said latch to said second bearing block, said latch is comprised of a latch member having a free end for engaging the support housing and a latch plate secured to said latch member, and one of said latch member and latch plate has an arcuate portion defining an opening through which said pivot pin extends.

8. The overbed table of claim 1 wherein said trigger and said latch each have apertures through which said cable extends, and said cable has enlarged upper and lower ends to prevent removal of said cable from said trigger and latch, whereby actuation of said trigger pulls the lower end of said cable upwardly against the bottom of said latch to pivot said latch away from locking position.

9. The overbed table of claim 8 wherein cable fasteners are attached to the cable ends to prevent removal of the cable through the cable apertures in said trigger and latch.

10. The overbed table of claim 1 further comprising means for adjusting the lower limit of downward movement of the table top.

11. In an overbed table having a base, a table top generally overlying said base, and an adjustable support assembly having its lower end secured to the base and its upper end to the table top and allowing the table top to be moved to any desired vertical position and locked, said support assembly comprising:

a tubular support housing vertically mounted to said base;

a first bearing block mounted to the upper portion of said housing and having guide apertures;

a pair of support rods axially slidable within said guide apertures, one of said support rods having an axial bore defined therethrough;

a second bearing block mounted to the lower end of said support rods and axially slidable within said housing, said second bearing block having spaced flanges defining a recess in the bottom thereof and a bore axially aligned with said support rod bore opening into said recess;

a coiled leaf spring connected between said support housing and said support rods for urging said support rods and table top upwardly and counterbalancing the weight thereof;

a latch mounted within said recess for pivotal movement about a horizontal axis and having a free end portion extending outwardly from said second bearing block;

a compression spring partially disposed within said bearing block bore and engaging the other end portion of said latch to urge said other end portion away from said second bearing block in one angular direction and said free end portion toward a locking position in wedged engagement with the wall of the support housing to lock said support rods relative to said housing;

a handle pivotally mounted to said table top; and, a cable extending through the bores of said one support rod and said second bearing block, said cable passing through apertures in said handle at its upper end and said other end portion of said latch at its lower end and having enlarged ends to prevent removal of said cable from said handle and latch, whereby actuation of said handle pulls the lower end of said cable upwardly against the bottom of said latch to pivot said latch in an angular direction opposite the action of said compression spring out of engagement with said support housing wall to unlock said support rods thereby permitting vertical movement of said support rods within said support housing for adjusting the height of the table top relative to the base.

* * * * *